(12) United States Patent
Wu

(10) Patent No.: US 8,511,655 B2
(45) Date of Patent: Aug. 20, 2013

(54) BICYCLE SEAT POST

(75) Inventor: Yan-Ting Wu, Chiayi (TW)

(73) Assignee: Durashox Technology Co., Ltd., Taichung (TW)

( * ) Notice: Subject to any disclaimer, the term of this patent is extended or adjusted under 35 U.S.C. 154(b) by 470 days.

(21) Appl. No.: 13/008,029

(22) Filed: Jan. 18, 2011

(65) Prior Publication Data

US 2012/0098175 A1    Apr. 26, 2012

(30) Foreign Application Priority Data

Oct. 21, 2010   (TW) ................................ 99220386 U

(51) Int. Cl.
*B62J 1/02*   (2006.01)

(52) U.S. Cl.
USPC ............ 267/132; 280/283; 280/287; 248/161

(58) Field of Classification Search
USPC .......... 267/131, 132; 280/283, 287; 248/161
See application file for complete search history.

(56) References Cited

U.S. PATENT DOCUMENTS

| | | | |
|---|---|---|---|
| 4,747,011 A | 5/1988 | Lissner | |
| 5,862,895 A | 1/1999 | Ricard | |
| 6,581,919 B2 * | 6/2003 | Barefoot et al. | 267/132 |
| 7,025,522 B2 * | 4/2006 | Sicz et al. | 403/109.2 |
| 8,398,104 B2 * | 3/2013 | Hsu | 280/220 |
| 2006/0066074 A1 * | 3/2006 | Turner | 280/287 |
| 2008/0315552 A1 * | 12/2008 | Hsu | 280/283 |
| 2012/0006949 A1 * | 1/2012 | Laird et al. | 248/161 |

\* cited by examiner

*Primary Examiner* — Christopher Schwartz
(74) *Attorney, Agent, or Firm* — CKC & Partners Co., Ltd.

(57) ABSTRACT

A seat post is disclosed. The seat post includes a pneumatic cylinder, a hollow pneumatic piston, a gap, a seal, a hydraulic cylinder, a hollow hydraulic piston, and a valve. The gap exists between the pneumatic cylinder and the pneumatic piston and communicates with the inside of the pneumatic piston. The seal is disposed at the pneumatic cylinder for sealing the gap. The hydraulic cylinder is disposed in the pneumatic piston and communicates with the inside of the pneumatic piston. One end of the hydraulic piston passes through pneumatic piston and is inserted into the hydraulic cylinder. The other end is disposed in the pneumatic cylinder and communicates with the inside of the pneumatic cylinder. The valve connects the pneumatic piston and the hydraulic cylinder for opening or closing the communication between the pneumatic piston and the hydraulic cylinder.

8 Claims, 10 Drawing Sheets

BICYCLE SEAT POST

RELATED APPLICATIONS

The application claims priority to Taiwan Application Serial Number 99220386, filed Oct. 21, 2010, which is herein incorporated by reference.

BACKGROUND

1. Technical Field

The present disclosure relates to a connection between a seat and a bicycle frame. More particularly, the present disclosure relates to a seat post.

2. Description of Related Art

A seat post is a tube for fixing a seat on a bicycle. More specifically, the seat post is telescopic for changing the height of the seat to fit users. Furthermore, the seat post can use threads, clamp, or pneumatic cylinder to fix the height of the seat.

As to the pneumatic cylinder, the seat post has a control lever for actuating the pneumatic cylinder. The seat post will be extended when the pneumatic cylinder is actuated and the user does not sit on the seat yet. The seat post will be contracted when the pneumatic cylinder is actuated and the user is sitting on the seat. The height of the seat is fixed when the pneumatic cylinder is shut down. Obviously, the adjusting speed of the pneumatic cylinder is better than threads and clamp.

However, the drawback of the pneumatic cylinder is that the pneumatic cylinder is easily to be compressed when the pneumatic cylinder is shut down and under a force. In other words, the height of the seat is changed when the user is sitting on the seat and compresses the pneumatic cylinder, even if the height of the seat is fixed. Therefore, some strength of the user for pedaling will transmit to the pneumatic cylinder and compress the pneumatic cylinder. It wastes the work of the user for pedaling. As above, it is difficult to increase the fixing stiffness of the seat post.

SUMMARY

The present disclosure provides a seat post for a bicycle. The seat post uses hydraulic pressure and gas pressure for resisting the compression and maintaining the adjusting speed.

According to one embodiment of the present disclosure, a seat post includes a first piston set, a second piston set, a valve, a liquid, and a gas. The first piston set includes a first cylinder, a first hollow piston, a gap, and a seal. The first cylinder connects to a frame of a bicycle. One end of the first hollow piston is inserted into the first cylinder and has a through hole. The other end of the first hollow piston connects to a seat of the bicycle. The gap exists between the inside of the first cylinder and the outside of the first hollow piston and communicates with the inside of the first hollow piston. The seal is disposed at the first cylinder for sealing the gap. The second piston set includes a second cylinder and a second hollow piston. The second cylinder is disposed in the first hollow piston and communicates with the inside of the first hollow piston. The cross-sectional area of the inside of the second cylinder is the same as the cross-sectional area of the gap. The gap, the inside of the first hollow piston, and the second cylinder composes a first chamber. One end of the second hollow piston passes through the through hole and is inserted into the second cylinder. The other end of the second hollow piston is disposed in the first cylinder. The inside of the second hollow piston communicates with the inside of the first cylinder. The inside of the first cylinder and the second hollow piston composes a second chamber. The valve connects the first hollow piston and the second cylinder for opening or closing the communication between the first hollow piston and the second cylinder. The liquid is stored in the first chamber. The gas is stored in the second chamber.

According to another embodiment of the present disclosure, a seat post includes a pneumatic cylinder, a hollow pneumatic piston, a gap, a seal, a hydraulic cylinder, a hollow hydraulic piston, a valve, and a locking hub. The pneumatic cylinder connects to a frame of a bicycle. The hollow pneumatic piston is received in the pneumatic cylinder and includes a through hole. One end of the hollow pneumatic piston connects to a seat of the bicycle. A gap exists between the outside of the hollow pneumatic piston and the inside of the pneumatic cylinder and communicates with the inside of the hollow pneumatic piston. The seal is disposed at the pneumatic cylinder for sealing the gap. The hydraulic cylinder is disposed in the hollow pneumatic piston and communicates with the inside of the hollow pneumatic piston. The cross-sectional area of the inside of the hydraulic cylinder is the same as the cross-sectional area of the gap. One end of the hollow hydraulic piston passes through the through hole and is in the hydraulic cylinder. The other end of the hollow hydraulic piston is disposed in the pneumatic cylinder. The inside of the hollow hydraulic piston communicates with the inside of the pneumatic cylinder. The valve connects the hollow pneumatic piston and the hydraulic cylinder for opening or closing the communication between the hollow pneumatic piston and the hydraulic cylinder. The locking hub includes two planes. The two planes are respectively disposed at the inside of the hollow pneumatic piston and the outside of the hollow hydraulic piston, wherein the two planes resist against each other.

According to yet another embodiment of the present disclosure, a seat post includes a pneumatic cylinder, a hollow pneumatic piston, a gap, a seal, a hydraulic cylinder, a hollow hydraulic piston, a valve, and a locking hub. The pneumatic cylinder connects to a frame of a bicycle. The hollow pneumatic piston is received in the pneumatic cylinder and includes a through hole. One end of the hollow pneumatic piston connects to a seat of the bicycle. A gap exists between the outside of the hollow pneumatic piston and the inside of the pneumatic cylinder and communicates with the inside of the hollow pneumatic piston. The seal is disposed at the pneumatic cylinder for sealing the gap. The hydraulic cylinder is disposed in the hollow pneumatic piston and communicates with the inside of the hollow pneumatic piston. The cross-sectional area of the inside of the hydraulic cylinder is the same as the cross-sectional area of the gap. One end of the hollow hydraulic piston passes through the through hole and is in the hydraulic cylinder. The other end of the hollow hydraulic piston is disposed in the pneumatic cylinder. The inside of the hollow hydraulic piston communicates with the inside of the pneumatic cylinder. The valve connects the hollow pneumatic piston and the hydraulic cylinder for opening or closing the communication between the hollow pneumatic piston and the hydraulic cylinder. The locking hub includes at least one groove and at least one rotating spindle. The groove is located on one of the outside of the hollow hydraulic piston and the inside of the hollow pneumatic piston, and the rotating spindle is located on the other of them.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
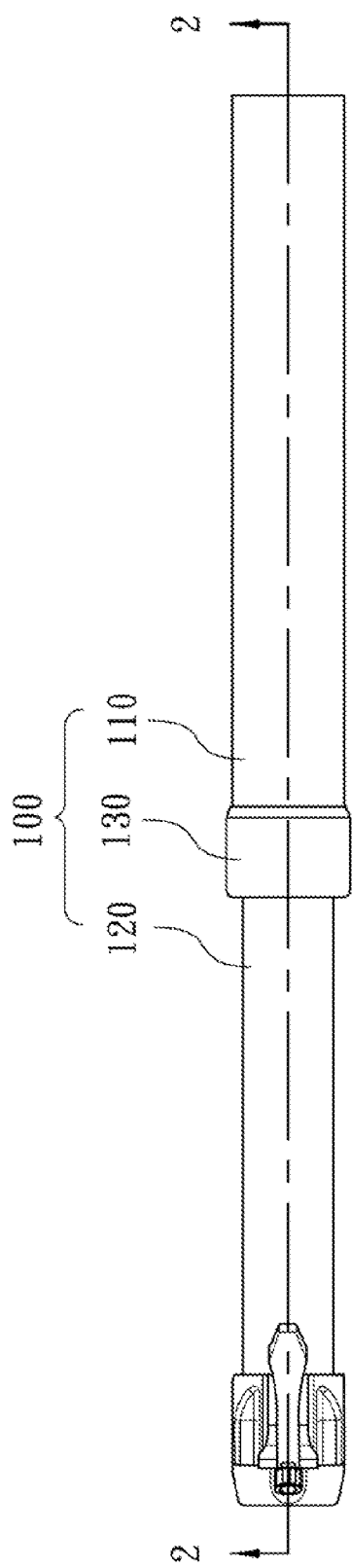
FIG. 1 is a plan view of a seat post according to one embodiment of the present disclosure.
Figure 2:
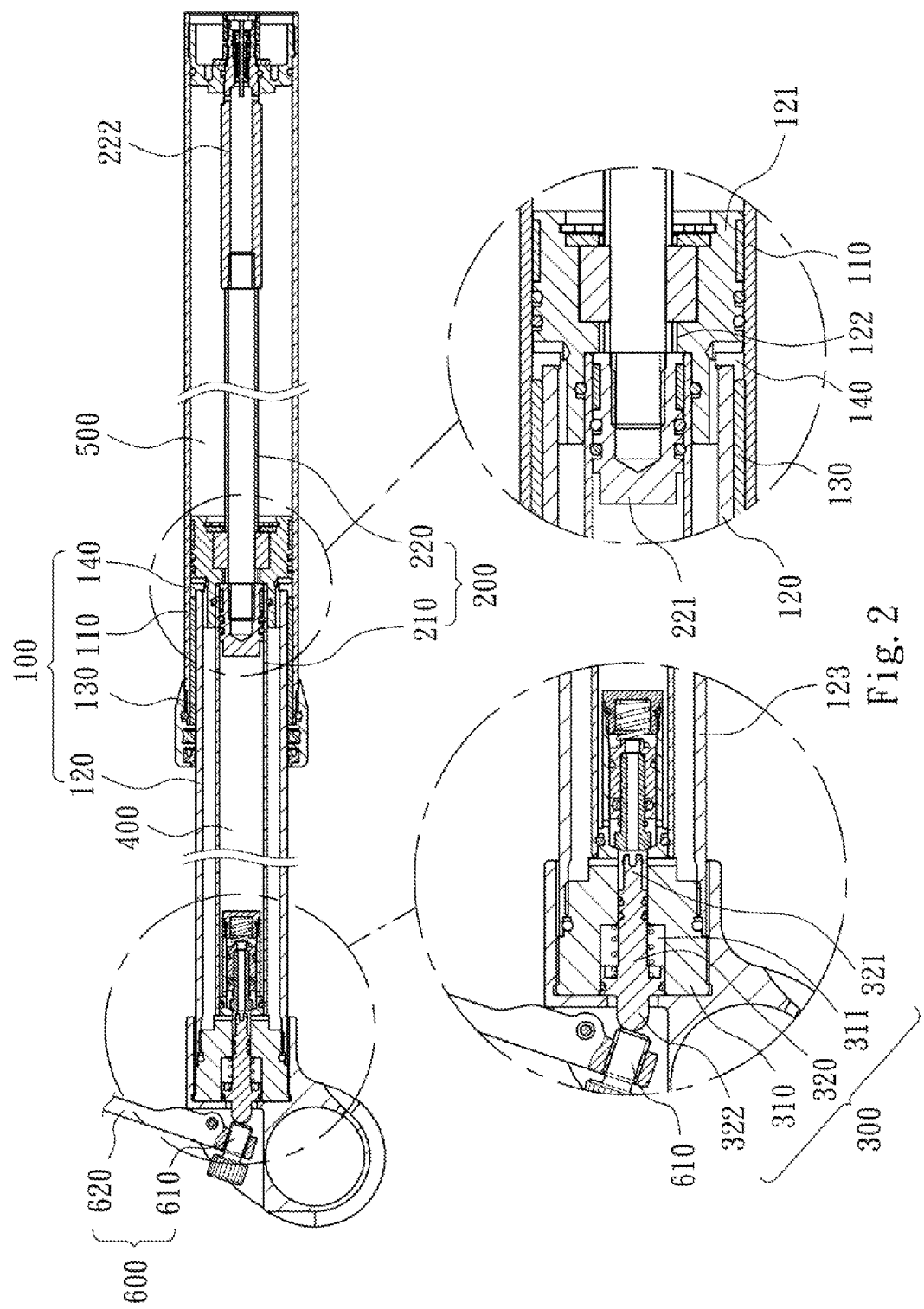
FIG. 2 is a cross-sectional view viewed along line 2-2 of FIG. 1.

FIG. 1 is a plan view of a seat post according to one embodiment of the present disclosure. FIG. 2 is a cross-sectional view viewed along line 2-2 of FIG. 1. The seat post includes a first piston set 100, a second piston set 200, a valve 300, a liquid 400, and a gas 500. The first piston set 100 includes a first cylinder 110, a first hollow piston 120, a gap 140, and a seal 130. The first cylinder 110 connects to a frame (not shown) of a bicycle (not shown). One end 121 of the first hollow piston 120 is inserted into the first cylinder 110 and has a through hole 122. The other end 123 of the first hollow piston 120 connects to a seat (not shown) of the bicycle. The gap 140 exists between the inside of the first cylinder 110 and the outside of the first hollow piston 120 and communicates with the inside of the first hollow piston 120. The seal 130 is disposed at the first cylinder 110 for sealing the gap 140. The second piston set 200 includes a second cylinder 210 and a second hollow piston 220. The second cylinder 210 is disposed in the first hollow piston 120 and communicates with the inside of the first hollow piston 120. The cross-sectional area of the inside of the second cylinder 210 is the same as the cross-sectional area of the gap 140. The gap 140, the inside of the first hollow piston 120, and the second cylinder 210 composes a first chamber. One end 221 of the second hollow piston 220 passes through the through hole 122 and is inserted into the second cylinder 210. The other end 222 of the second hollow piston 220 is disposed in the first cylinder 110. The inside of the second hollow piston 220 communicates with the inside of the first cylinder 110. The inside of the first cylinder 110 and the second hollow piston 220 composes a second chamber. The valve 300 connects the first hollow piston 120 and the second cylinder 210 for opening or closing the communication between the first hollow piston 120 and the second cylinder 210. The liquid 400 is stored in the first chamber. The gas 500 is stored in the second chamber.

The second cylinder 210 moves toward the second hollow piston 220 and presses the liquid 400 when the valve 300 is closed and the user is sitting on the seat. The liquid 400 in the second cylinder 210 cannot flow into the gap 140 and inside of the first hollow piston 120 because the valve 300 is closed. Furthermore, the first hollow piston 120 and the second cylinder 210 barely move, because the compressibility of the liquid 400 is less than the gas 500. Therefore, the compression resistance of the seat post is improved.

Figure 3:
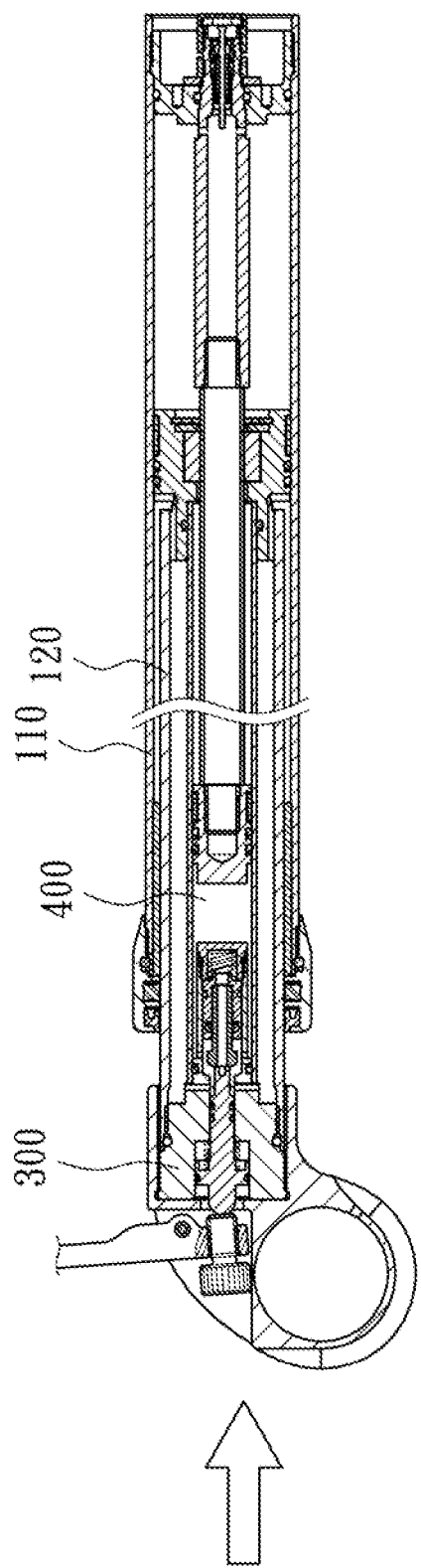
FIG. 3 illustrates the seat post of FIG. 2 in one operating mode.

FIG. 3 illustrates the seat post of FIG. 2 in one operating mode. The second cylinder 210 moves toward the second hollow piston 220 and presses the liquid 400 into the gap 140 through the inside of the first hollow piston 120, when the valve 300 is opened and the user is sitting on the seat. The moving distance of the second cylinder 210 and the first hollow piston 120 are the same as the increased distance of the gap 140 because of the same cross-sectional area of the inside of the second cylinder 210 and the gap 140. Therefore, the second cylinder 210 and the first hollow piston 120 move synchronically for contracting the seat post, lowering the height of the seat, and compressing the gas 500 in the first cylinder 110.

Figure 4:
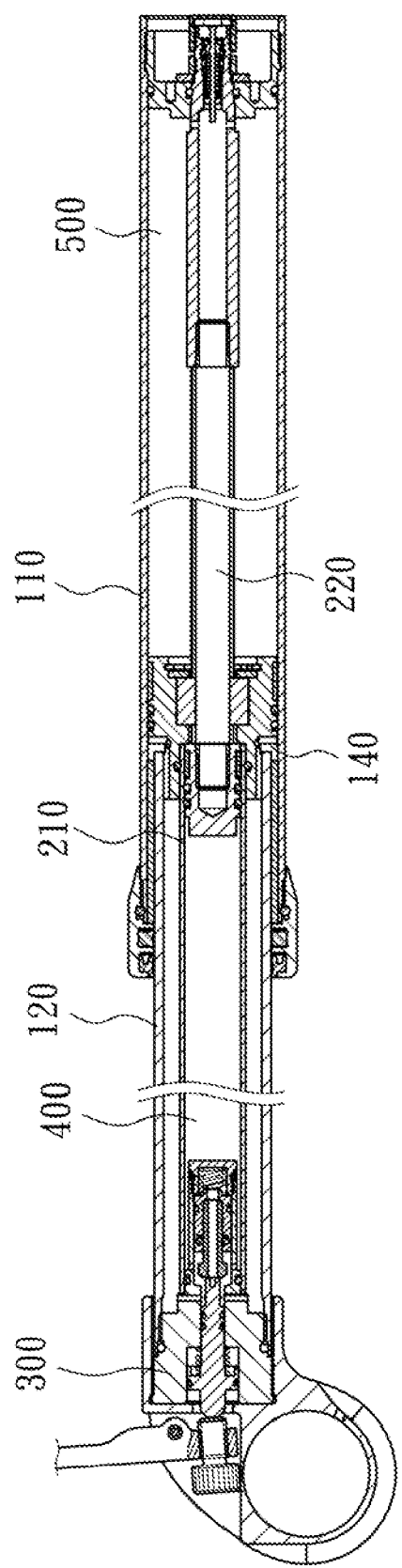
FIG. 4 illustrates the seat post of FIG. 3 in another operating mode.

FIG. 4 illustrates the seat post of FIG. 3 in another operating mode. The compressed gas 500 in the first cylinder 110 pushes the first hollow piston 120 and the second cylinder 210 back when the valve 300 is opened and the user leaves the seat. Furthermore, the distance of the gap 140 is decreased for pushing the liquid 400 back to the inside of the second cylinder 210, extending the seat post, and raising the height of the seat.

Therefore, the height of the seat is raised when the valve 300 is opened and the user leaves the seat. On the contrary, the height of the seat is lowered when the valve 300 is opened and the user is sitting on the seat. The height of the seat is fixed when the valve 300 is closed. It is obvious that the seat post maintains the adjusting speed of the seat post.

As shown in FIG. 2, the valve 300 includes a base 310 and a restoring rod 320. The base 310 connects to the first hollow piston 120 and the second cylinder 210. The base 310 includes a through hole 311. One end 321 of the restoring rod 320 passes through the through hole 311 of the base 310 for opening or closing the communication between the first hollow piston 120 and the second cylinder 210. The other end 322 of the restoring rod 320 protrudes from the base 310. The end 321 of the restoring rod 320 opens the communication between the first hollow piston 120 and the second cylinder 210 when the end 322 of the restoring rod 320 is pushed. On the contrary, the end 321 of the restoring rod 320 is restored and closes the communication between the first hollow piston 120 and the second cylinder 210 when the pushing force releases the end 322 of the restoring rod 320.

The seat post further includes a control lever 600. The control lever 600 is pivoted on the first hollow piston 120 for operating the valve 300. One end 610 of the control lever 600 pushes the restoring rod 320. The other end 620 of the control lever 600 is operated by the user. The valve 300 is opened when the user operates the control lever 600 to push the restoring rod 320. On the contrary, the restoring rod 320 and the control lever 600 are restored and the valve 300 is closed when the user releases the control lever 600.

Figure 5:
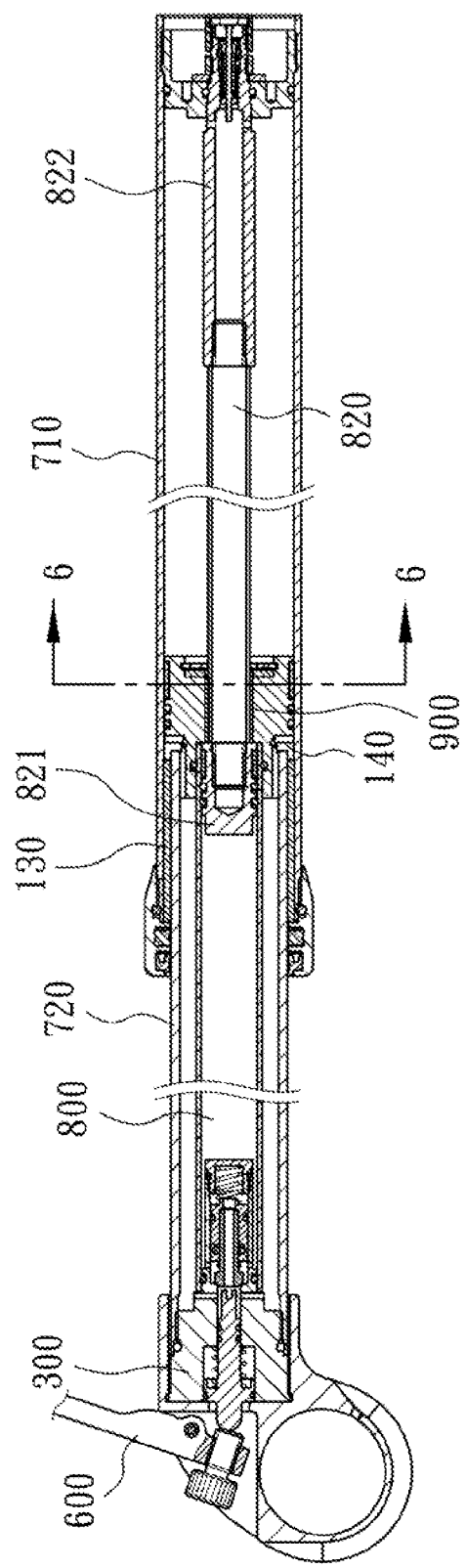
FIG. 5 is a cross-sectional view of a seat post according to another embodiment of the present disclosure.
Figure 6:
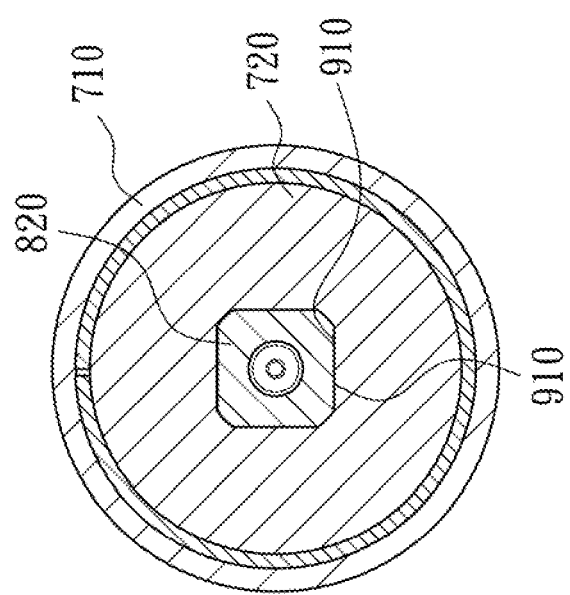
FIG. 6 is a cross-sectional view viewed along line 6-6 of FIG. 5.

FIG. 5 is a cross-sectional view of a seat post according to another embodiment of the present disclosure. FIG. 6 is a cross-sectional view viewed along line 6-6 of FIG. 5. The seat post includes a pneumatic cylinder 710, a hollow pneumatic piston 720, a gap 730, a seal 130, a hydraulic cylinder 810, a hollow hydraulic piston 820, a valve 300, and a locking hub 900. The pneumatic cylinder 710 is considered as the first cylinder 110. The hollow pneumatic piston 720 is considered as the first hollow piston 120. The hydraulic cylinder 810 is considered as the second cylinder 210. The hollow hydraulic piston 820 is considered as the second hollow piston 220. The pneumatic cylinder 710 connects to a frame of a bicycle. The hollow pneumatic piston 720 is received in the pneumatic cylinder 710 and includes a through hole 721. One end of the hollow pneumatic piston 720 connects to a seat of the bicycle. A gap 730 exists between the outside of the hollow pneumatic piston 720 and the inside of the pneumatic cylinder 710 and communicates with the inside of the hollow pneumatic piston 720. The seal 130 is disposed at the pneumatic cylinder 710 for sealing the gap 730. The hydraulic cylinder 810 is disposed in the hollow pneumatic piston 720 and communicates with the inside of the hollow pneumatic piston 720. The cross-sectional area of the inside of the hydraulic cylinder 810 is the same as the cross-sectional area of the gap 730. One end 821 of the hollow hydraulic piston 820 passes through the through hole 721 and is in the hydraulic cylinder 810. The other end 822 of the hollow hydraulic piston 820 is disposed in the pneumatic cylinder 710. The inside of the hollow hydraulic piston 820 communicates with the inside of the pneumatic cylinder 710. The valve 300 connects the hollow pneumatic piston 720 and the hydraulic cylinder 810 for opening or closing the communication between the hollow pneumatic piston 720 and the hydraulic cylinder 810. The locking hub 900 includes two planes 910. The two planes 910 are respectively disposed at the inside of the hollow pneumatic piston 720 and the outside of the hollow hydraulic piston 820, wherein the two planes 910 resist against each other.

The two planes 910 are disposed at the inside of the hollow pneumatic piston 720 and the outside of the hollow hydraulic piston 820 directly. Thus, the outside of the hollow hydraulic piston 820 and the inside of the hollow pneumatic piston 720 resist against each other directly. Therefore, the hollow hydraulic piston 820 and the hollow pneumatic piston 720 are only axially moved according to the locking hub 900. Furthermore, the pneumatic cylinder 710 cannot rotate about the hollow pneumatic piston 720, because the hollow pneumatic piston 720 connects to the hydraulic cylinder 810, and the hollow hydraulic piston 820 connects to the pneumatic cylinder 710. Therefore, the operation of the seat post includes extension and contraction except for rotation. Thus, the seat post disposed on the bicycle can fix the horizontal angle of the seat.

As shown in FIG. 5, the valve 300 is the same as that shown in FIG. 2. The base 310 of the valve 300 connects to the hollow pneumatic piston 720 and the hydraulic cylinder 810. The restoring rod 320 of the valve 300 passes through the base 310 for opening or closing the communication between the hollow pneumatic piston 720 and the hydraulic cylinder 810. The seat post further includes a control lever 600, and the control lever 600 is the same as that shown in FIG. 2. The control lever 600 is pivoted on the hollow pneumatic piston 720 for operating the valve 300.

Figure 7:
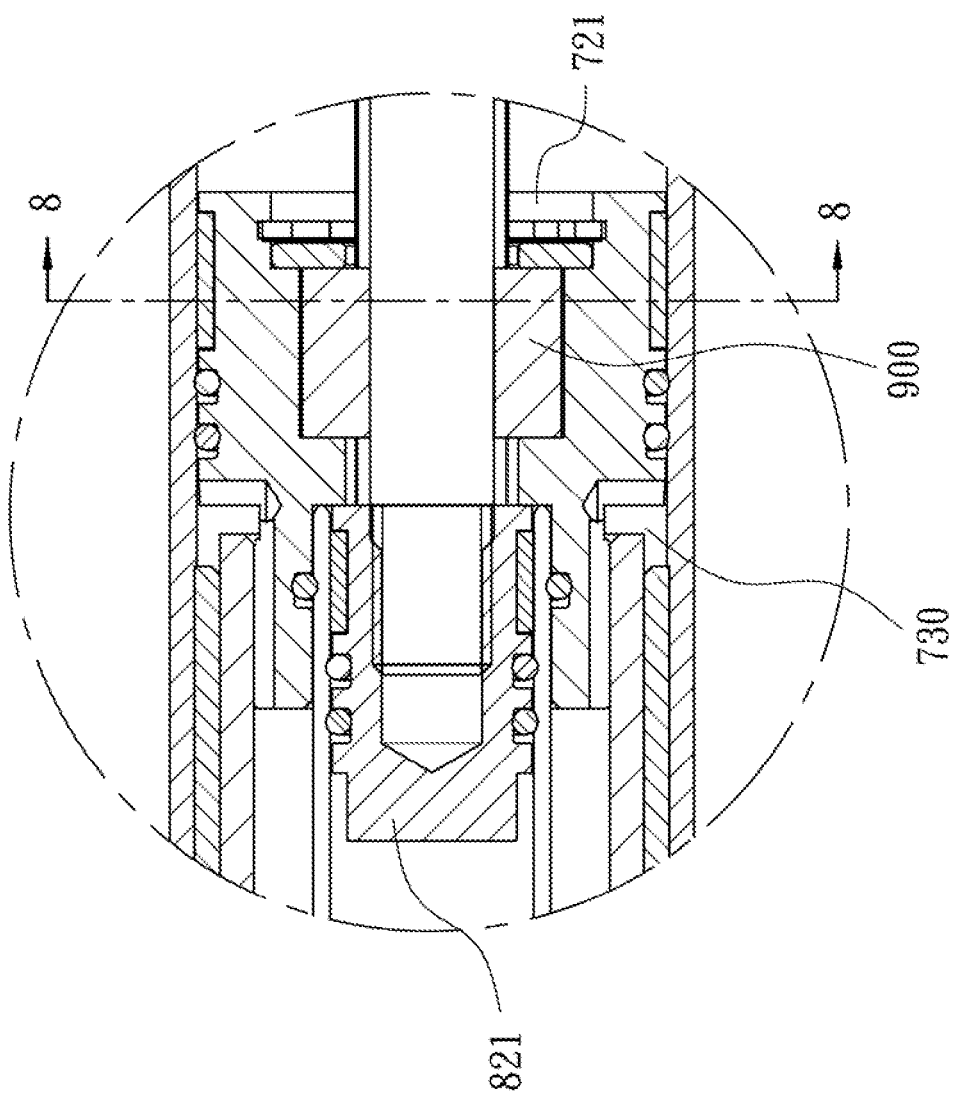
FIG. 7 illustrates the seat post of FIG. 5 in another embodiment of the present disclosure.
Figure 8:
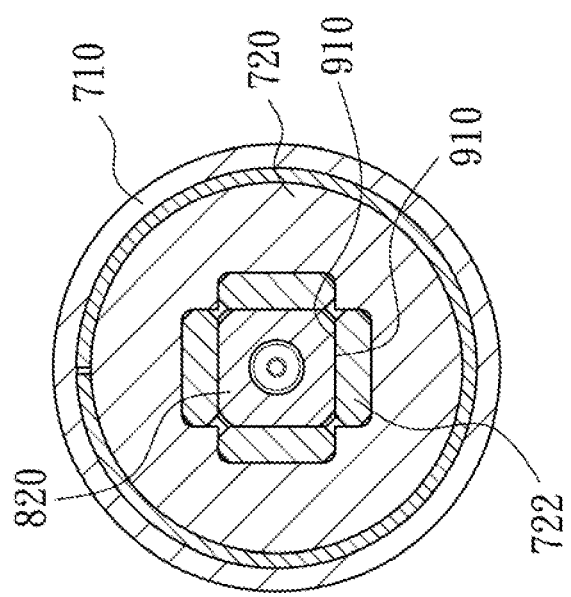
FIG. 8 is a cross-sectional view viewed along line 8-8 of FIG. 7.

FIG. 7 illustrates the seat post of FIG. 5 in another embodiment of the present disclosure. FIG. 8 is a cross-sectional view viewed along line 8-8 of FIG. 7. The hollow pneumatic piston 720 includes a cushion 722 positioned in the through hole 721 of the inside of the hollow pneumatic piston 720. The two planes 910 are respectively disposed at the cushion 722 in the inside of the hollow pneumatic piston 720 and the outside of the hollow hydraulic piston 820. The cushion 722 resists against the hollow hydraulic piston 820. Furthermore, the cushion 722 is made of anti-abrasion material, such as copper, for increasing the lifetime. Additionally, the shape of the cushion 722 is cylindrical. The cushion 722 reduces the friction between the hydraulic cylinder 810 and the pneumatic piston as the roller when the hydraulic cylinder 810 and the pneumatic piston move relative to each other.

Figure 9:
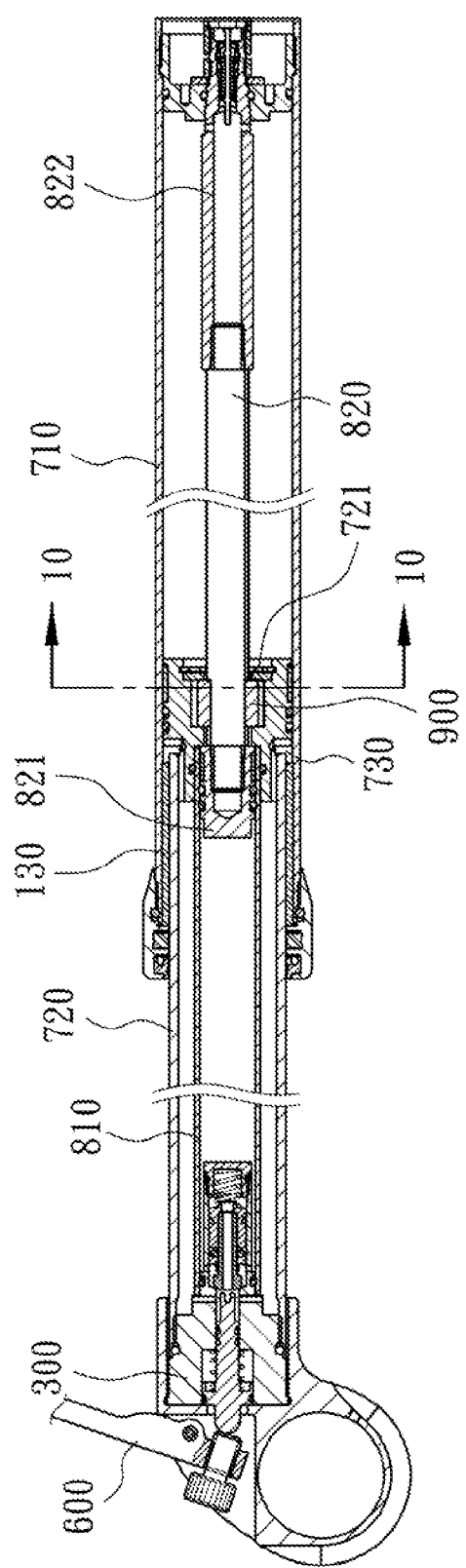
FIG. 9 is a cross-sectional view of a seat post according to another embodiment of the present disclosure.
Figure 10:
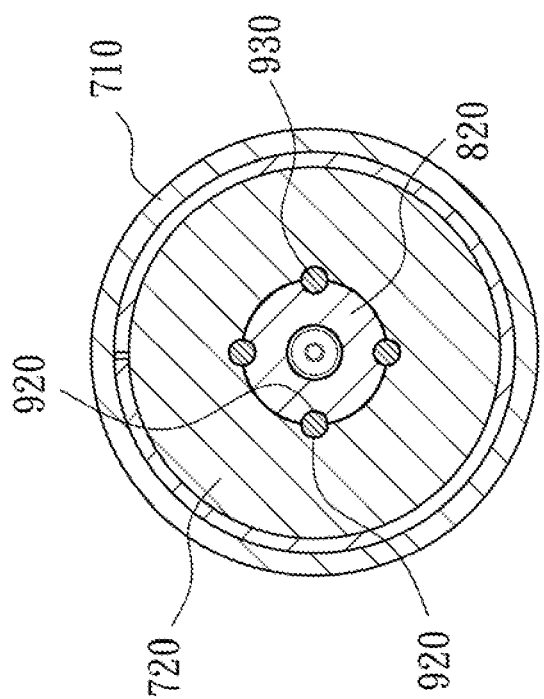
FIG. 10 is a cross-sectional view viewed along line 10-10 of FIG. 9.

FIG. 9 is a cross-sectional view of a seat post according to another embodiment of the present disclosure. FIG. 10 is a cross-sectional view viewed along line 10-10 of FIG. 9. The seat post shown in FIG. 9 is similar to that shown in FIG. 5. The difference between FIG. 9 and FIG. 5 is that the locking hub 900 of FIG. 9 includes at least one groove 920 and at least one rotating spindle 930. The groove 920 is located on one of the outside of the hollow hydraulic piston 820 and the inside of the hollow pneumatic piston 720. The rotating spindle 930 is located on the other of them and received in the groove 920.

In detail, the locking hub 900 includes two grooves 920. The two grooves 920 are respectively located on the outside of the hollow hydraulic piston 820 and the inside of the through hole 721 in the inside of the hollow pneumatic piston 720. The rotating spindle 930 is positioned between the two grooves 920.

Figure 11:
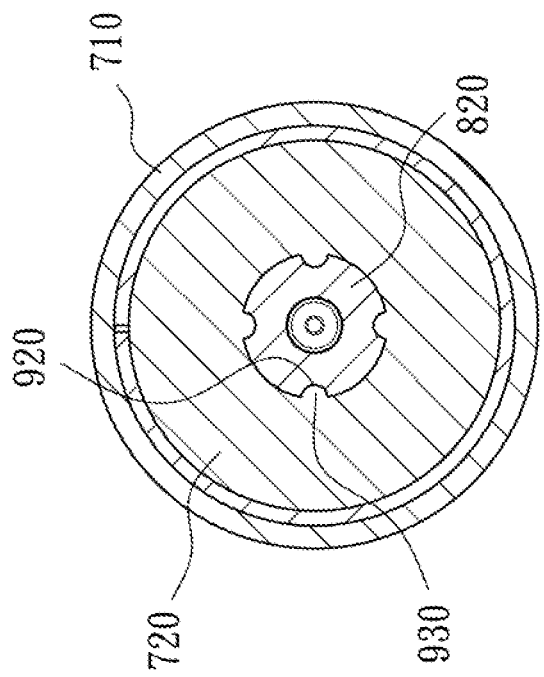
FIG. 11 illustrates the seat post of FIG. 10 in another embodiment of the present disclosure.

FIG. 11 illustrates the seat post of FIG. 10 in another embodiment of the present disclosure. The locking hub 900 includes only one groove 920. The groove 920 is located on the outside of the hollow hydraulic piston 820 and the rotating spindle 930 is fixed at the inside of the through hole 721 in the inside of the hollow pneumatic piston 720, or the groove 920 is located on the inside of the through hole 721 in the inside of the hollow pneumatic piston 720 and the rotating spindle 930 is fixed at the outside of the hollow hydraulic piston 820. In this embodiment, the rotating spindle 930 is fixed at the outside of the hollow hydraulic piston 820. All of the locking hubs 900 of FIG. 9 have the same advantage as the locking hub 900 of FIG. 5.

As shown in FIG. 9, the valve 300 is the same as that shown in FIG. 5. The seat post further includes a control lever 600 the same as that shown in FIG. 5.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. §112, 6th paragraph. In particular, the use of "step of" in the claims is not intended to invoke the provisions of 35 U.S.C. §112, 6th paragraph.

What is claimed is:

1. A seat post, comprising:
    a first piston set comprising a first cylinder, a first hollow piston, a gap, and a seal,
        the first cylinder for connecting to a frame of a bicycle,
        one end of the first hollow piston inserted into the first cylinder and having a through hole,
        the other end of the first hollow piston for connecting to a seat of the bicycle,
        the gap existing between the inside of the first cylinder and the outside of the first hollow piston and communicating with the inside of the first hollow piston,
        the seal disposed at the first cylinder for sealing the gap;
    a second piston set comprising a second cylinder and a second hollow piston,
        the second cylinder disposed in the first hollow piston and communicating with the inside of the first hollow piston, the cross-sectional area of the inside of the second cylinder the same as the cross-sectional area of the gap, the gap, the inside of the first hollow piston, and the second cylinder composing a first chamber;

one end of the second hollow piston passing through the through hole and inserted into the second cylinder, the other end of the second hollow piston disposed in the first cylinder, the inside of the second hollow piston communicating with the inside of the first cylinder, the inside of the first cylinder and the second hollow piston composing a second chamber;

a valve connecting the first hollow piston and the second cylinder for opening or closing the communication between the first hollow piston and the second cylinder; and a liquid stored in the first chamber; and a gas stored in the second chamber.

2. The seat post of claim 1, further comprising a control lever pivoted on the first hollow piston for operating the valve.

3. A seat post comprising:

a pneumatic cylinder for connecting to a frame of a bicycle;

a hollow pneumatic piston received in the pneumatic cylinder and comprising a through hole, one end of the hollow pneumatic piston connecting to a seat of the bicycle;

a gap existing between the outside of the hollow pneumatic piston and the inside of the pneumatic cylinder and communicating with the inside of the hollow pneumatic piston;

a seal disposed at the pneumatic cylinder for sealing the gap;

a hydraulic cylinder disposed in the hollow pneumatic piston and communicating with the inside of the hollow pneumatic piston, the cross-sectional area of the inside of the hydraulic cylinder the same as the cross-sectional area of the gap;

one end of hollow hydraulic piston passing through the through hole and in the hydraulic cylinder, the other end of the hollow hydraulic piston disposed in the pneumatic cylinder, the inside of the hollow hydraulic piston communicating with the inside of the pneumatic cylinder;

a valve connecting the hollow pneumatic piston and the hydraulic cylinder for opening or closing the communication between the hollow pneumatic piston and the hydraulic cylinder; and a locking hub comprising two planes, the two planes respectively disposed at the inside of the hollow pneumatic piston and the outside of the hollow hydraulic piston, wherein the two planes resist against each other.

4. The seat post of claim 3, wherein the hollow pneumatic piston comprises a pad positioned in the through hole, the two planes respectively disposed at the pad and the outside of the hollow hydraulic piston.

5. The seat post of claim 3, further comprising a control lever pivoted on the valve for operating the valve.

6. A seat post comprising:

a pneumatic cylinder for connecting to a frame of a bicycle;

a hollow pneumatic piston received in the pneumatic cylinder and comprising a through hole, one end of the hollow pneumatic piston connecting to a seat of the bicycle;

a gap existing between the outside of the hollow pneumatic piston and the inside of the pneumatic cylinder and communicating with the inside of the hollow pneumatic piston;

a seal disposed at the pneumatic cylinder for sealing the gap;

a hydraulic cylinder disposed in the hollow pneumatic piston and communicates with the inside of the hollow pneumatic piston, the cross-sectional area of the inside of the hydraulic cylinder the same as the cross-sectional area of the gap;

one end of the hollow hydraulic piston passing through the through hole and in the hydraulic cylinder, the other end of the hollow hydraulic piston disposed in the pneumatic cylinder, the inside of the hollow hydraulic piston communicating with the inside of the pneumatic cylinder;

a valve connecting the hollow pneumatic piston and the hydraulic cylinder for opening or closing the communication between the hollow pneumatic piston and the hydraulic cylinder; and a locking hub comprising at least one groove and at least one rotating spindle, wherein the groove is located on one of the outside of the hollow hydraulic piston and the inside of the hollow pneumatic piston, and the rotating spindle is located on the other of them.

7. The seat post of claim 6, further comprising a control lever pivoted on the valve for operating the valve.

8. The seat post of claim 6, wherein the number of the grooves of the locking hub is two, the two grooves respectively located on the outside of the hollow hydraulic piston and the inside of the through hole of the hollow pneumatic piston for holding the rotating spindle.

* * * * *